US012584084B2

(12) United States Patent
Martin et al.

(10) Patent No.: US 12,584,084 B2
(45) Date of Patent: Mar. 24, 2026

(54) USE OF BY-PRODUCTS FROM THE ALCOHOLIC BEVERAGE MANUFACTURING INDUSTRY

(71) Applicant: MiAlgae Ltd., Edinburgh (GB)

(72) Inventors: Douglas Martin, Edinburgh (GB); Shreekanth Ramananthan, Edinburgh (GB); Julian Pietrzyk, Edinburgh (GB)

(73) Assignee: MIALGAE LTD., Edinburgh (GB)

( * ) Notice: Subject to any disclaimer, the term of this patent is extended or adjusted under 35 U.S.C. 154(b) by 539 days.

(21) Appl. No.: 17/907,054

(22) PCT Filed: Mar. 23, 2021

(86) PCT No.: PCT/GB2021/050706
§ 371 (c)(1),
(2) Date: Sep. 22, 2022

(87) PCT Pub. No.: WO2021/191596
PCT Pub. Date: Sep. 30, 2021

(65) Prior Publication Data
US 2023/0121767 A1     Apr. 20, 2023

(30) Foreign Application Priority Data
Mar. 23, 2020     (GB) ..................................... 2004205

(51) Int. Cl.
*C12F 3/08*     (2006.01)
*C12F 3/10*     (2006.01)

(52) U.S. Cl.
CPC . *C12F 3/08* (2013.01); *C12F 3/10* (2013.01)

(58) Field of Classification Search
None
See application file for complete search history.

(56) References Cited

U.S. PATENT DOCUMENTS

| | | |
|---|---|---|
| 11,046,977 B2 | 6/2021 | White et al. |
| 11,198,889 B2 | 12/2021 | White et al. |
| 2013/0219776 A1 | 8/2013 | White et al. |
| 2013/0298453 A1 | 11/2013 | White et al. |
| 2016/0244789 A1 | 8/2016 | Mathur et al. |
| 2017/0137849 A1 | 5/2017 | White et al. |
| 2017/0159079 A1 | 6/2017 | White et al. |
| 2018/0119177 A1 | 5/2018 | White et al. |
| 2018/0119178 A1 | 5/2018 | White et al. |
| 2019/0040419 A1 | 2/2019 | White et al. |
| 2019/0040420 A1 | 2/2019 | White et al. |
| 2020/0149074 A1 | 5/2020 | White et al. |

FOREIGN PATENT DOCUMENTS

| | | |
|---|---|---|
| CN | 104256086 A | 1/2015 |
| CN | 108424938 A | 8/2018 |
| CN | 108893501 A | 11/2018 |
| CN | 109207378 A | 1/2019 |
| WO | 2020/026794 A1 | 2/2020 |

OTHER PUBLICATIONS

Quilodran et. al., "Docosahexaenoic Acid (C22:6n-3, DHA) and Astaxanthin Production by *Thraustochytriidae* sp. AS4-A1 a Native Strain with High Similitude to *Ulkenia* sp.: Evaluation of Liquid Residues from Food Indusry as Nutrient Sources", Enzyme and Microbial Technology, Stoneham, MA, US, Jul. 5, 2010, vol. 47, No. 1-2, pp. 24-30.

Quilodran et. al., "Evaluation of Liquid Residues from Beer and Potato Processing for the Production of Docosahexaenoic Acid (C22:6n-3, DHA) by Native *Thraustochytrid* Strains", World Journal of Microbiology and Biotechnology, Kluwer Academic Publishers, Jul. 17, 2009, vol. 25, No. 12, pp. 2121-2128.

Yamasaki et. al., "Utilization of Shochu Distillery Wastewater for Production of Polyunsaturated Fatty Acids and Xanthophylls Using Thraustochytrid", Journal of Bioscience and Bioengineering, Elsevier, Amsterdam, NL, Oct. 1, 2006, vol. 102, No. 4, pp. 323-327.

Combined Search and Examination Report dated Jun. 22, 2020 issued in United Kingdom Patent Application No. GB2004205.7 (9 pages).

International Search Report and Written Opinion dated Jun. 21, 2021 issued in International Application No. PCT/GB2021/050706 (11 pages).

*Primary Examiner* — Brian Gangle

(74) *Attorney, Agent, or Firm* — FOX ROTHSCHILD LLP

(57) ABSTRACT

A by-product from an alcoholic beverage manufacturing process may be used to cultivate a thraustochytrid. The by-product may comprise a residue from a distillation step used in malt whisky manufacture, such as pot ale. The cultivation may be used to provide a product with enhanced amounts of lipids, oils, or fatty acids, including omega-3 fatty acids.

12 Claims, 11 Drawing Sheets

USE OF BY-PRODUCTS FROM THE ALCOHOLIC BEVERAGE MANUFACTURING INDUSTRY

CROSS-REFERENCE TO RELATED APPLICATIONS

The present application is a National Stage Application under 35 U.S.C. § 371 of International Application No. PCT/GB2021/050706 filed Mar. 23, 2021, which claims the benefit of priority to GB 2004205.7 filed Mar. 23, 2020. The disclosures of each of the foregoing applications are hereby incorporated by reference in their entireties.

The present invention relates to the cultivation of microorganisms using by-products of the alcoholic beverage manufacturing industry, and through this cultivation to the production of useful compounds, including for example oils and fatty acids.

The production of alcoholic beverages results in by-products. These by-products, often simply treated as waste products, either need to be disposed of in an environmentally responsible and cost-effective manner or a use needs to be found for them.

To take one example, the manufacture of malt whisky produces several such by-products. One of the major whisky by-products is pot ale, this being the residue left following the first distillation which is performed in a pot still.

The quantity of pot ale produced in a distillery amounts to around two thirds of the charge of a pot still. Typically for every litre of whisky made, eight litres of pot ale are produced. Thus, a very significant quantity of this nutrient rich by-product liquid is generated and requires to be disposed of.

The manufacture of whisky involves two distillations, with the product of the first distillation proceeding to a second distillation. The residue left following the second distillation in the whisky manufacture process is called spent lees. The quantity of spent lees is typically a third of the initial charge volume of the second distillation. The volume of spent lees produced is considerably less than the volume of pot ale, but it is still a significant by-product of the whisky manufacturing process which needs to be dealt with.

Another example of a nutrient rich by-product is in the manufacturing process of beer. The brewing of beer produces wet colloidal debris, often referred to as trub. In terms of the brewing process, trub is the material left after the wort has been boiled and transferred for brewing. Trub also describes the sediment left at the bottom of a fermenter after fermentation. This, as well as wash waters and other industrial waters in the beer making process, provide for nutrient rich effluent which generally cannot simply be discharged into a municipal sewage system at no cost.

The by-products of alcoholic beverage manufacture are often in themselves of low economic value. They are currently disposed of or used in several ways. For example, pot ale can be used as the basis for feed for ruminant stock. Pot ale can also be used as field spread, as can brewery effluent. Each of these methods of disposal comes with costs. The production of stock feed requires large quantities of energy. For instance, pot ale needs to be significantly reduced in water content, and this costs energy. Typically over 90% of the water content of pot ale is removed in the production of stock feed. Unavoidable costs involved in transporting by-products away to treatment or disposal sites can also be considerable. Whisky distilleries are often sited in remote locations and this is a factor in any haulage or transport costs.

Due to the significant quantities of by-products from the manufacture of alcoholic beverages and due to the significant amount of organic material present in these by-products, alternative disposal paths which reduce the economic and environmental costs are sought.

One recent use of pot ale is as a nutrient source for a fermentation process producing butanol and/or acetone (WO 2012/001416).

The present invention addresses the problem of finding alternative and useful disposal paths for the by-products of the manufacture of alcoholic beverages.

In a first aspect of the invention there is provided the use of a composition for cultivating a thraustochytrid wherein the composition comprises a by-product from an alcoholic beverage manufacturing process.

We have found that thraustochytrids, compared to other microorganisms, are particularly effective and efficient at processing alcoholic beverage by-products.

Thraustochytrids are microorganisms which are heterotrophic, meaning that they require an external supply of energy contained in complex organic compounds to maintain their existence. Thraustochytrids can act as scavengers and decomposers of organic material, from which they obtain the complex organic compounds they require to survive. In their natural habitat thraustochytrids generally live in a marine (saline) environment.

Through feeding on alcoholic beverage by-products thraustochytrids accumulate significant amounts of useful materials including lipids, oils, fatty acids, for example omega-3 fatty acids including eicosapentaenoic acid (EPA) and docosahexaenoic acid (DHA) and antioxidants. These are, or can be incorporated into, foodstuffs, supplements, or nutraceuticals, for humans, animals or fish.

One area where the present invention is particularly useful is that of aquaculture. The fish farming industry uses a large amount of omega-3 foodstuffs. The present invention provides a safe and sustainable foodstuff in contrast to some conventional methods which source fishmeal and fishoil from pelagic fish or other unsustainable origins.

Demand is also rising for omega-3 products and other beneficial nutrients provided by the present invention, for human consumption.

The present invention not only converts distillery and brewery waste by-products to useful materials but also cleans up said waste by-products so that they can be safely discharged back to the environment.

The materials produced in the present invention may be extracted from or purified from thraustochytrid cultures, or alternatively compositions comprising the thraustochytrids themselves as well as the materials produced may be used directly for some applications. The thraustochytrids and the depleted media along with the residue of the by-products can be centrifuged and dehydrated (e.g. dried in an oven or spray dried).

The composition used for cultivating the thraustochytrid may have a $BOD_5$ value, when measured according to standardized test method 5210B in "Standard Methods for the Examination of Water and Wastewater" (Clesceri et al, 2005, Washington DC: American Public Health Association, American Water Works Association, and the Water Environment Association; standardmethods.org) falling within the range of 1 to 50 g/L, optionally 1 to 40 g/L, optionally 5 to 30 g/L, optionally 10 to 20 g/L.

The $BOD_5$ value according to the above-mentioned test method is one way of quantifying the biochemical oxygen demand of the material used to cultivate the thraustochytrid. It provides an indication of the amount of biodegradable organic matter present: it is the amount of dissolved oxygen required by aerobic biological organisms to break down organic material present in a given aqueous sample at certain temperature over a specific time period. Unpolluted rivers typically have a BOD below 1 mg/L. Moderately polluted rivers vary between 2 to 8 mg/L. Untreated sewage averages between 200 and 600 mg/L while efficiently treated municipal sewage would be 20 mg/L or less.

Thus it can be seen that the present invention can surprisingly deal with waste by-products which have a very high biochemical oxygen demand and which would otherwise generally require some other processing or disposal.

Another way of defining the composition used for cultivating the thraustochytrid is in terms of its chemical oxygen demand (COD). This is a measure of the amount of oxygen consumed when a strong oxidising agent is used to oxidise the materials present. A given sample may have a higher COD value than BOD value because the former depends on the total organic content whereas the latter depends on the organic content which can be consumed under certain biological conditions. A standard test method for determining COD is ASTM D1252-06 (2012)e1, Test Method B, Standard Test Methods for Chemical Oxygen Demand (Dichromate Oxygen Demand) of Water, ASTM International, West Conshohocken, PA, 2012, astm.org). The composition used for cultivating the thraustochytrid in accordance with the present invention may have a COD according to this test method falling within the range of 1 to 100 g/L, optionally 1 to 50 g/L, optionally 1 to 40 g/L, optionally 5 to 30 g/L, optionally 10 to 20 g/L, optionally 2 to 100 g/L, optionally 2 to 80 g/L, optionally 10 to 60 g/L, optionally 20 to 40 g/L.

The present invention can surprisingly deal with waste by-products which have a very high chemical oxygen demand and which would otherwise generally require some other processing or disposal.

The composition used in the present invention for cultivating the thraustochytrid may be, or may comprise, a distillery by-product. This may optionally be selected from one or more of draff, pot ale, pot ale syrup, spent lees, barley dark grain, spent wash, spent wash syrup, wastewater, or wheat or maize dark grains.

The distillery by-product may be from a malt distilling process or a grain distilling process.

The distillery by-product may be a whisky by-product, for example a malt whisky by-product, for example a Scotch whisky by-product. The whisky by-product may be pot ale.

The present invention may also utilise pot ale from other sources, i.e. from alcohol production processes, not just pot ale produced during whisky production.

The pot ale may be provided by a process which comprises distilling a wash, optionally in a copper distillation vessel, to produce a low wines distillate (which is the material which is processed further, by further distillation and other steps, to produce the alcoholic beverage) and said pot ale. Said wash, which comprises alcohol and water and other materials, may be provided by a preceding fermentation step which comprises the fermentation of a wort using yeast. Said wort comprises one or more carbohydrates, for example glucose and/or other sugars. Worts may be derived by known processes, for example by malting and mashing as well known in the whisky making sector.

The composition used in the present invention for cultivating the thraustochytrid may be, or may comprise, a brewing by-product. The brewing by-product may be brewing effluent. The brewing by-product may be trub. Trub is the sediment formed from unfermentable products in wort. The brewing by-product may be brewing wastewater.

During distillation a liquid which has already gone through a fermentation process to produce alcohol is heated, thus separating off ethanol from diluting components such as water. Other volatile components, generally organics, are also extracted from the fermented liquid during a distillation. Any distillation which is part of the manufacture of an alcoholic beverage leaves behind a remnant liquid and/or solid by-product. This remnant by-product contains organic matter, which may include yeasts or yeast residue from the fermentation, and may act as a nutrient source for thraustochytrids.

The solids content of the composition used for cultivating the thraustochytrid may optionally be up to 30% w/w, optionally up to 20% w/w, optionally up to 15%, optionally up to 10% w/w, optionally up to 5% w/w, optionally up to 3% w/w, optionally up to 1% w/w. The solids content of the composition used for cultivating the thraustochytrid may optionally be at least 0.1% w/w, optionally at least 0.5% w/w, optionally at least 1% w/w, optionally at least 3% w/w. For example the range may be between 1 and 15%. One advantage of the present invention arises from the ability of thraustochytrids to process pot ale or other alcoholic industry by-products which may have some solid content. Nevertheless, the invention does not require solids to be present and waste by-products which have no or minimal solids content, include those which been through a process step such as for example filtration or other process to remove solids, are also processed effectively by thraustochytrids.

The composition used for cultivating the thraustochytrid may comprise yeast or yeast residue. Optionally the amount of yeast or yeast residue present is between 0.1% and 20% by weight, e.g. between 1% and 15% by weight.

The composition used for cultivating the thraustochytrid may comprise carbohydrate(s). Optionally the carbohydrate content is between 5 and 100 g per litre, e.g. between 10 and 70 g per litre, e.g. between 20 and 50 g per litre, e.g. between 5 and 40 g per litre, e.g. between 50 and 100 g per litre.

The composition used for cultivating the thraustochytrid may comprise nitrate(s). Optionally the nitrate content is within the range 500-1,500 mg/l, or 750-1,000 mg/l, or 500-750 mg/l, or 1,000-1,500 mg/l.

The composition used for cultivating the thraustochytrid may comprise phosphate(s). Optionally the phosphate content is within the range 100-250 mg/l, or 150-200 mg/l, or 100-150 mg/l, or 200-250 mg/l.

The composition used for cultivating the thraustochytrid may comprise proteins. Optionally the protein content is 1 to 100 g/l, or 5 to 75 g/l, or 8 to 50 g/l.

The composition may comprise salt(s), for example sodium chloride in the range 0.1 M to 0.8 M.

The composition may comprise salt(s), for example artificial sea salts in the range of 0.13M to 0.6 M. The artificial sea salts may contain sodium chloride as the major component, for example sodium chloride in an amount of over 60 mol %, or 60 to 90 mol %, or 65 to 70 mol %, or about 66 mol %. The artificial sea salts have the following composition:

| | |
|---|---|
| NaCl | 66.1% |
| MgSO$_4$•7H$_2$O | 16.3% |
| MgCl$_2$ | 12.7% |
| CaCl$_2$ | 3.3% |
| KCl | 1.6% |

The composition may comprise salt(s), for example in the range 5-50 g/l, or 10-40 g/l, or 15-30 g/l, or 5-20 g/l, or 25-50 g/l, or 8.5-43 g/l, or 8.75-42.5 g/l.

The composition used for cultivating the thraustochytrid may have a pH of between 5 and 9, optionally between 6 and 8, optionally between 6.5 and 7.8, optionally between 6.8 and 7.5

The by-product (e.g. the pot ale) may be diluted, for example with water, for example with mains water, to thereby provide the composition which is used for cultivating the thraustochytrid. This dilution may result in the composition achieving the characteristics outlined herein, e.g. the BOD value, COD value, solids content, or other characteristics. Pot ale may optionally be diluted by a factor of between 2 and 5. Optionally, pot ale may be diluted so that it makes up between 15% and 60%, optionally between 20% and 50%, optionally between 25% and 37.5%, optionally between 25% and 35%, of the volume of the composition which is used for cultivating the thraustochytrid.

We had expected that it would be necessary to dilute the pot ale to a significantly greater extent. The ability of the method of the invention to process a composition which is relatively highly concentrated, with significant COD and BOD values, is surprising.

We had also expected that the pot ale would require some form of purification such as centrifugation or filtration to remove solids and potential microbial inhibitors. Surprisingly, the process of the present invention is robust enough to handle the by-products whole. Therefore the present invention provides the use of a composition for cultivating a thraustochytrid wherein the composition comprises a by-product from an alcoholic beverage manufacturing process without purification.

Pot ale may also suitably be diluted using wash waters or other water from the distillery. This brings further advantages in influencing the pH of the composition to thereby reduce the need for other components to be used. Wash waters from the distillery may be alkaline and alkaline wash waters may be useful to correct the acidic nature of the pot-ale. Spent lees may also be used to provide the required dilution for the pot ale. Spent lees are the residue from the second distillation in the production of whisky, and are low on nutrients compared to pot ale. Water which is separated from the thraustochytrids following the growth according to the present invention may also be used to dilute the pot ale.

The by-product used in the present invention, for example pot ale, may contain significant amounts of copper. This can be due to the vessel, for example a pot still, being made of copper, or due to the presence of copper apparatus. The copper content is such that pot ale-based feed cannot be used for sheep which are sensitive to overdoses of copper in their diet. In relation to the present invention, the copper content in pot ale might have been expected to inhibit the efficiency of microorganism growth. However, the inventors have found that thraustochytrids are surprisingly unaffected by this at the concentration levels of the present invention.

Other materials may be added to the by-product to result in the composition used for cultivating the thraustochytrid.

Even though the by-product, for example pot ale, may be nutrient rich, it may lack enough carbohydrate content for optimal growth of heterotrophic thraustochytrid. The growth medium may thus comprise an additional quantity of carbohydrate.

Suitable carbohydrates for adding additionally may include monosaccharides, such as glucose, fructose or galactose, or oligosaccharides of these. Other suitable carbohydrates may include disaccharides, such as lactose, maltose or sucrose. Other complex carbon or carbohydrate sources, such as glycerol, may also be suitable to include in the growth medium. Other possible components are compounds (e.g. crude glycerol) from biodiesel production, sodium acetate, fructose and potato starch. Other possible components are cellulosic biomass, carboxylic acids and their salts, fatty acids, amino acids, alcohols, esters and other derivatives. These chemicals may provide sources of carbon required for thraustochytrid growth.

The process of cultivating the thraustochytrid may comprise:
(i) a first stage in which the thraustochytrid is proliferated from a small quantity, or inoculum, of thraustochytrid; and
(ii) a second stage in which the nutrient supply differs from that of the first phase so that a stress response of the thraustochytrid enhances the accumulation of one or more omega-3 oil or other useful product.

We have found that, whilst the present invention allows the accumulation of omega-3 oils and other useful materials without needing such a two-stage process, using such a two-stage process can bring further advantages and can increase the amount of useful product and efficiency with which it can be produced.

Optionally, the first stage may itself be considered to comprise two phases: a sporulation phase and a proliferation phase. In the sporulation phase, conditions, e.g. the nutrient supply, may be selected to enhance, encourage or optimise the production of spores. In the proliferation phase, conditions, e.g. the nutrient supply, may be selected to enhance, encourage or optimise the proliferation of the thraustochytrid.

The first stage may use a composition comprising an alcoholic beverage process by-product (e.g. a composition comprising pot ale) and optionally other materials such as an additional carbohydrate (e.g. glucose) and dissolved oxygen and salts.

The sporulation phase within the first stage may use a composition comprising a defined media that incorporates a carbohydrate source (e.g. glucose), salts and an inorganic nitrate source to promote sporulation.

The proliferation phase within the first stage may use a composition comprising an alcoholic beverage process by-product (e.g. a composition comprising pot ale) and optionally other materials such as an additional carbohydrate (e.g. glucose) and dissolved oxygen and salts that favour cell growth.

The second stage may be distinguished from the first stage in that at least some of the nutrients from an alcoholic beverage process by-product (e.g. a composition comprising pot ale) are depleted and optionally wherein a further amount of a carbohydrate (e.g. glucose) is added at the start of the second stage. The further amount of carbohydrate may be utilized by the thraustochytrid, under the depleted nutrient conditions, to produce fatty acids e.g. omega-3 oils.

The amount of added carbohydrate (e.g. glucose) in the first stage may optionally be between 5 and 60 g/L, optionally between 5 and 50 g/L, optionally between 10 and 40 g/L, optionally between 10 and 30 g/L, optionally between 15 and 25 g/L. The amount of added carbohydrate (e.g. glucose) in the second stage may optionally be the same. These amounts are applicable when a range of alcoholic by-products are used, for example pot ale (e.g. pot ale diluted to 20 to 55% by volume, e.g. 30 to 45% by volume, e.g. 35 to 40% by volume).

According to the present invention, the thraustochytrid microorganism may initially be given time to grow, typically over a period of a few days (for example 1 to 5 days, for example 2 to 4 days, for example 3 to 4 days, for example 78 hours to 90 hours) at a temperature chosen to optimise growth (for example room temperature or ambient temperature or slightly above the same, for example 20 to 40 degrees C., for example 25 to 35 degrees C., for example about 30 degrees C.). The amount of added inorganic nitrate may optionally be between 1 and 10 g/L. This may maximise the production of spores to allow for higher cell densities during fermentation.

After this initial growing period, the cells may be transferred to a media composed of the alcoholic beverage process by-product (e.g. a composition comprising pot ale) for growth. After a few days (which may optionally be 3 to 7 days) a further quantity of the additional carbohydrate may be added. This may help the microorganism consume the nutrients supplied by the pot ale or other by-product to a maximum extent. The quantity of carbon source added at this stage is dependent on the amount or density of thraustochytrid which has formed. It is also possible at this time after the initial growing period to reduce the operating temperature, for example to around 5 to 20 degrees C., e.g. 10 to 15 degrees C.

The alterations to the growth conditions introduced after a few days (which may optionally be 3 to 4 days) of starting cultivation are intended to induce a stress reaction in the microorganism resulting in an increased production of fatty acids by the thraustochytrid. The depletion of the nutrients may help to cause this stress reaction. The reduced temperature may also help to encourage the stress reaction.

The growing conditions may include: temperature, salinity of the growth medium, pH of the growth medium, amount of additional carbohydrate present in the growth medium. While the thraustochytrid is being cultivated one of more of the following adjustments to the growth conditions may be made:

The temperature may be raised or lowered;

The salinity of the growth medium may be adjusted (e.g. increased);

The pH of the growth medium may be adjusted;

Additional carbohydrate may be added to the growth medium.

Air, typically sterile, may be supplied to the cultivation vessel during growth. The air may be supplied through a sparger. The air may be filtered.

Optionally, the by-product from an alcoholic beverage manufacturing process may be subjected to an enzymatic pre-treatment step. Without wishing to be bound by theory, a portion of the distillery by-product's organic matter may be less bioavailable and underutilised during high density (i.e. added carbon source) cultivation. This portion may include intact yeast cells and grain proteins, as well as carbohydrates that failed to be hydrolysed to a yeast fermentable form. Enzymatic pre-treatment of the by-products may convert such compounds to simpler and more readily assimilated materials. Enzymes which may be used include the following commercially available enzymes: amyloglucosidase, prolyl endopeptidase, cellulase, papain, subtilisin and lyticase.

The method of growing thraustochytrid disclosed in the present application has been found, in some cases, to result in an approximately 50 to 95% reduction, e.g. approximately 75 to 95% reduction, e.g. approximately 90% reduction of the initial BOD value or COD value of the pot ale or other by-product.

Following completion of the cultivation, the cultivated thraustochytrid microorganism may be separated from the growth medium solution. This separation may be achieved for example by centrifugation, settling, chemical flocculation, bio-flocculation, flotation or membrane filtering. The dewatering of the product of the growth process may reduce its volume by 5% to 20%, e.g. 8% to 10%, producing an omega-3 enriched algal paste. The final product may contain thraustochytrids and separated-out pot ale solids. The product may take the form of an algal paste.

The aqueous solution resulting from this step of separation may be reused to dilute a fresh quantity of pot ale or other by-product to produce a fresh growth medium. Use of such separated water in subsequent thraustochytrid cultivation may help to promote growth rates.

Further processing of the algal paste may be performed to produce an oil or a powder. The oil or powder is also Omega-3 rich and can be utilised as aquaculture feed.

In a further aspect of the invention there is provided a method of amassing lipids produced by thraustochytrid cultivated as described herein.

In a further aspect of the invention there is provided a method of amassing fatty acids, for example Omega-3 oils, from thraustochytrid cultivated as described herein.

In a further aspect of the invention there is provided a method of producing feed for aquaculture from thraustochytrid cultivated as described herein.

In a further aspect of the invention there is provided a method for cultivating a thraustochytrid in a vessel containing a composition which comprises a by-product from an alcoholic beverage manufacturing process, as defined above in relation to the first aspect.

An advantage of the present invention is that, even though the method can be used to produce a foodstuff suitable for consumption by fish, animals and fish, the vessel does not need to be pressure-rated and does not need to be a pharmaceutical-grade vessel. A standard brewing vessel (for example a stainless steel brewing vessel) may be used. This brings considerable cost savings. It is also convenient. The process may optionally be carried out at or in the vicinity of the distillery or brewery where the alcoholic process by-product is produced, and which will already have ease of access to and supply of brewing vessels. The vessel may be a modified brewing fermentor. In use the vessel may be aerated.

The method may comprise a preceding step of sterilizing the vessel. Additionally, ports and lines connected to the vessel, and in particular those ports and lines which are to be used for charging components to or releasing components from the vessel, may be sterilized. The sterilization may comprise one or more step of rinsing with clean water. The sterilization may comprise one or more step of cleaning with an alkali (for example a sodium hydroxide solution) optionally at an elevated temperature (e.g. above 40 degrees C., e.g. above 50 degrees C., e.g. at about 50 to 70 degrees C., e.g. at about 60 degrees C.). The sterilization may comprise one or more step of applying an antimicrobial agent, for example a peroxide, for example peracetic acid, and allowing the same to dry and coat the interior surfaces. The sterilization may comprise more than one, or all of these steps. For example, the sterilization may comprise cleaning with alkali, rinsing with water, and application of antimicrobial agent. Optionally there may be a step of rinsing or cleaning (e.g. rinsing with clean water) prior to the step of cleaning with alkali. The vessel may be maintained under a positive pressure during sterilization, for example by the injection of inert gas, e.g. sterile air, into the vessel, for example through a sparger at the bottom of the vessel.

Such a sterilization procedure may be carried out with the cultivation equipment in an assembled state. This clean-in-place (CIP) method ensures high standards of hygiene and we have found that this is advantageous when culturing thraustochytrids. The sterilization may be such that it ensures an environment in which thraustochytrids may be cultivated using an alcoholic beverage process by-product for example pot ale.

A further advantage of the sterilization procedure of the present invention is that it negates the need to carry out steam sterilisation which can require more expensive pressure-related vessels.

The seed microorganism may be taken from a monoculture of thraustochytrid. Subculturing from a plate and liquid culture growth at this stage may each be possible. Each has its advantages: subculturing from a plate minimises the risk of contamination; liquid culture growth is generally faster. In any event the purity of the inoculum may be tested prior to use.

In accordance with the present invention, the vessel is charged with thraustochytrid and with the composition which comprises a by-product from an alcoholic beverage manufacturing process and which will be used to effect the cultivation of the thraustochytrid. Said composition may be pasteurized before entering the vessel. Surprisingly, despite the fact that the by-product may have already been subjected to considerable heat treatment (for example, pot ale may have been boiled for about 3 hours as part of a whisky preparation process), we have found that pasteurization can bring additional advantages and can increase efficacy and reliability. Without wishing to be bound by theory, this may be because contaminants (e.g. from sporulating organisms) may be incorporated when the pot ale or other by-product is removed from the distilling or brewing apparatus, for example if such sporulating organisms reside in ports or lines.

The pasteurization may comprise heating the composition to a temperature and for a period of time sufficient to eliminate pathogens and other organisms other than yeast.

The pasteurization may comprise heating the composition to a temperature of for example to 70 to 125 degrees C. or higher, for example 70 to 110 degrees C. optionally 80 to 100 degrees C., optionally 80 to 90 degrees C., optionally 90 to 100 degrees C., optionally 85 to 95 degrees C. The composition may be heated to that temperature for a period of time which may optionally be 10 seconds to 120 seconds or longer, optionally 10 seconds to 90 seconds, optionally 20 seconds to 60 seconds, optionally 20 seconds to 40 seconds, optionally 25 to 35 seconds. Optionally the heat treatment may be a stepped heat treatment whereby the composition is in a preceding step and/or in a subsequent step heated at a lower temperature.

The pasteurization may be inline pasteurization. The pasteurization may be carried out by a heat exchange method whereby heat is transferred to the composition through a heat plate or heat exchanger by a hot water or hot oil circuit.

The following examples summarise some experiments carried out and features of some embodiments of the invention and it will be understood that the scope of the invention is not limited to these details. Reference is made to the figures in which.

Figure 9:
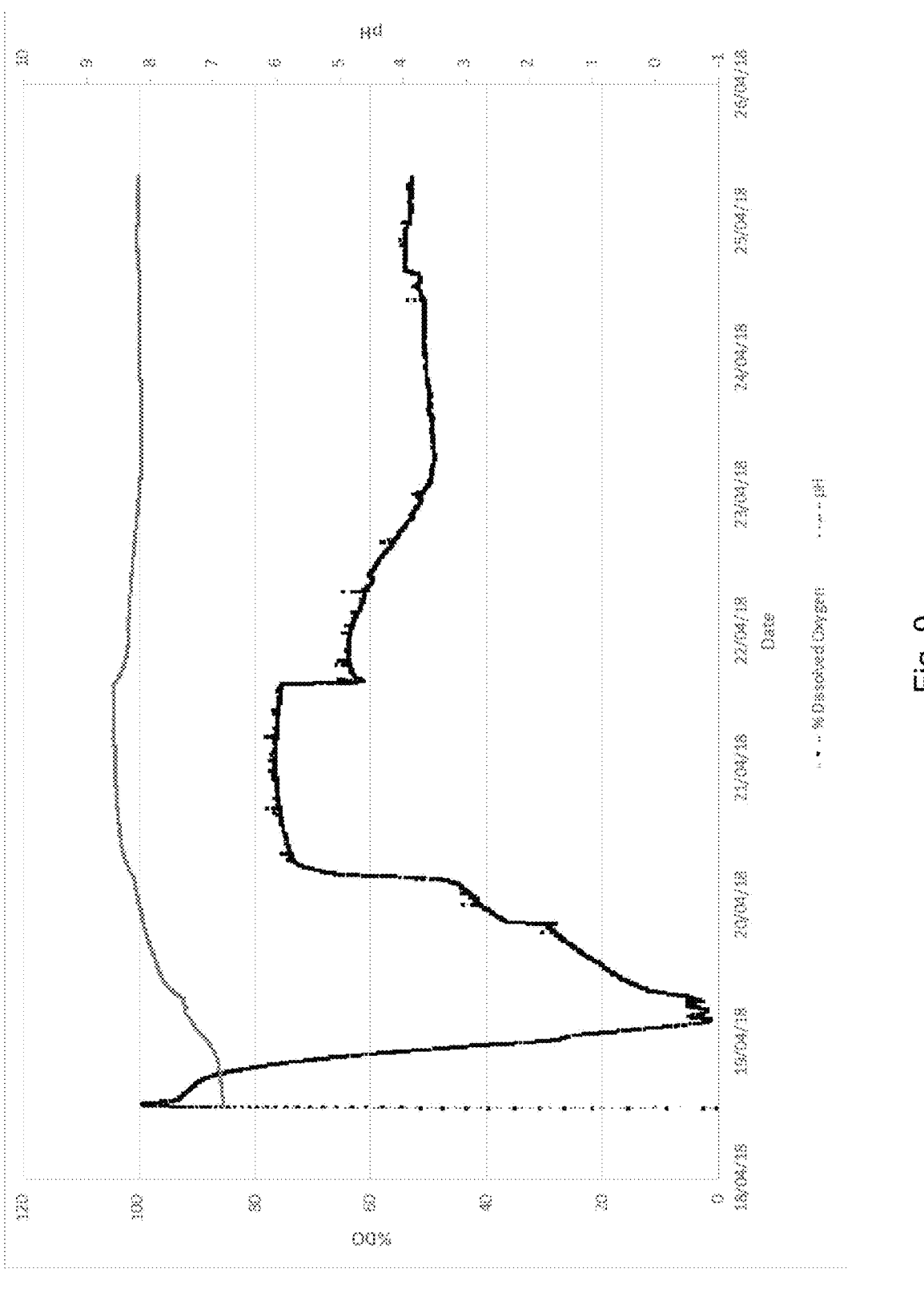
Figure 10:
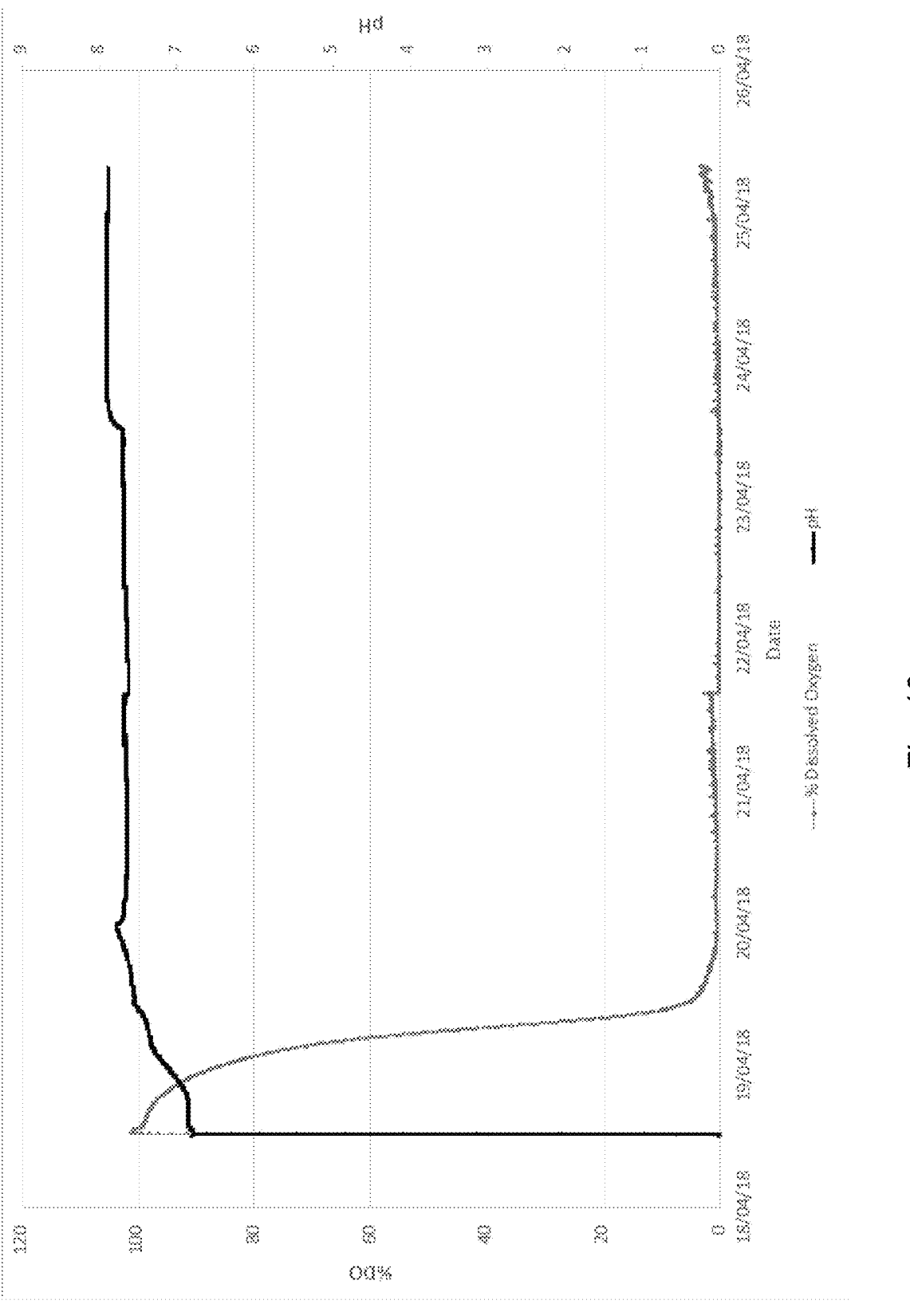
Figure 11:
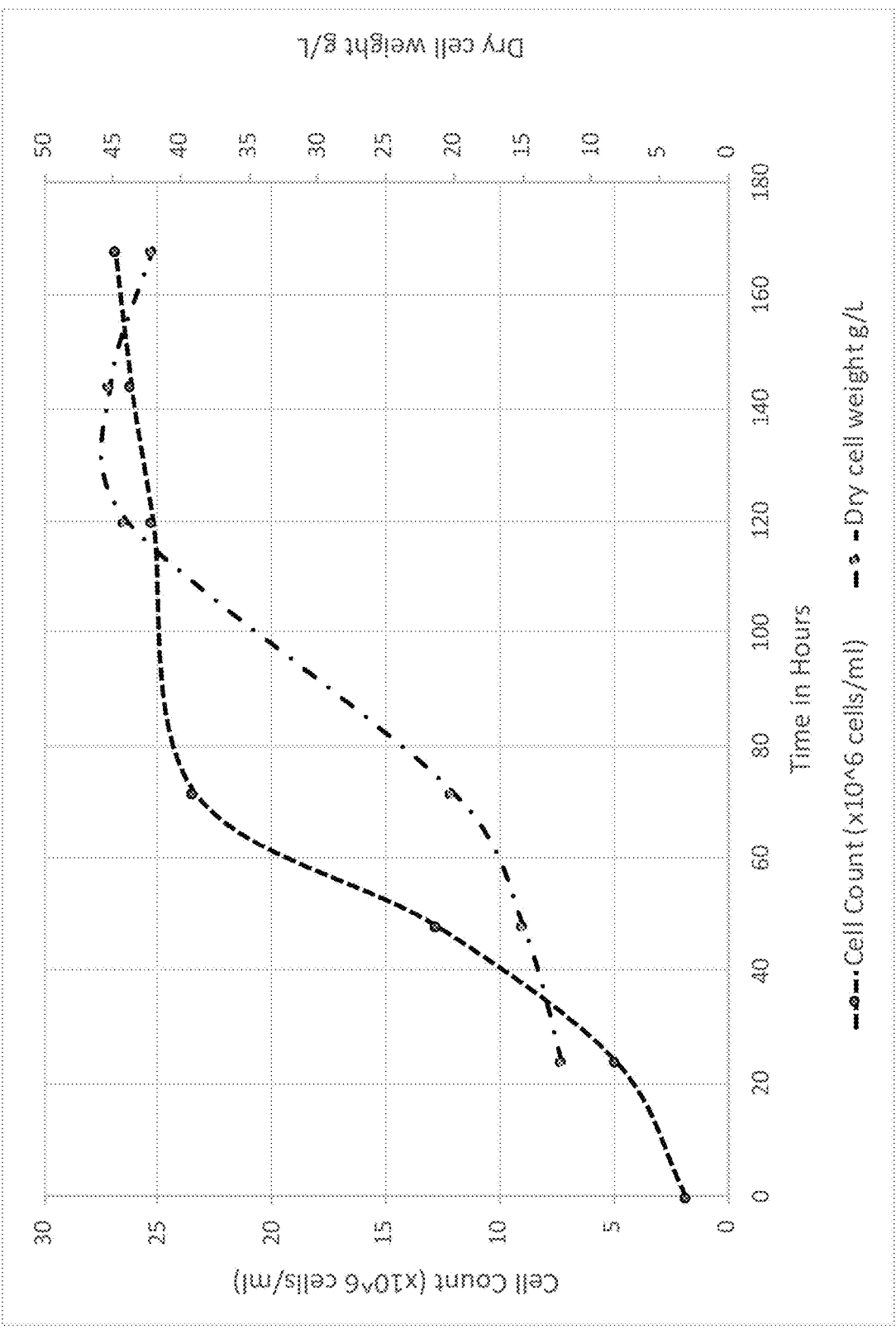

FIGS. 9 and 10 show the change in dissolved oxygen content and pH over time, in growth media comprising 25% (by volume) of pot ale inoculated with a sample of the thraustochytrid *Aurantiochytrium* sp., where additional glucose is added; and FIG. 11 shows the change in cell count and dry cell weight during cultivation of the thraustochytrid *Aurantiochytrium* in media comprising pot ale and glucose, with further glucose added post-innoculation.

Figure 1:
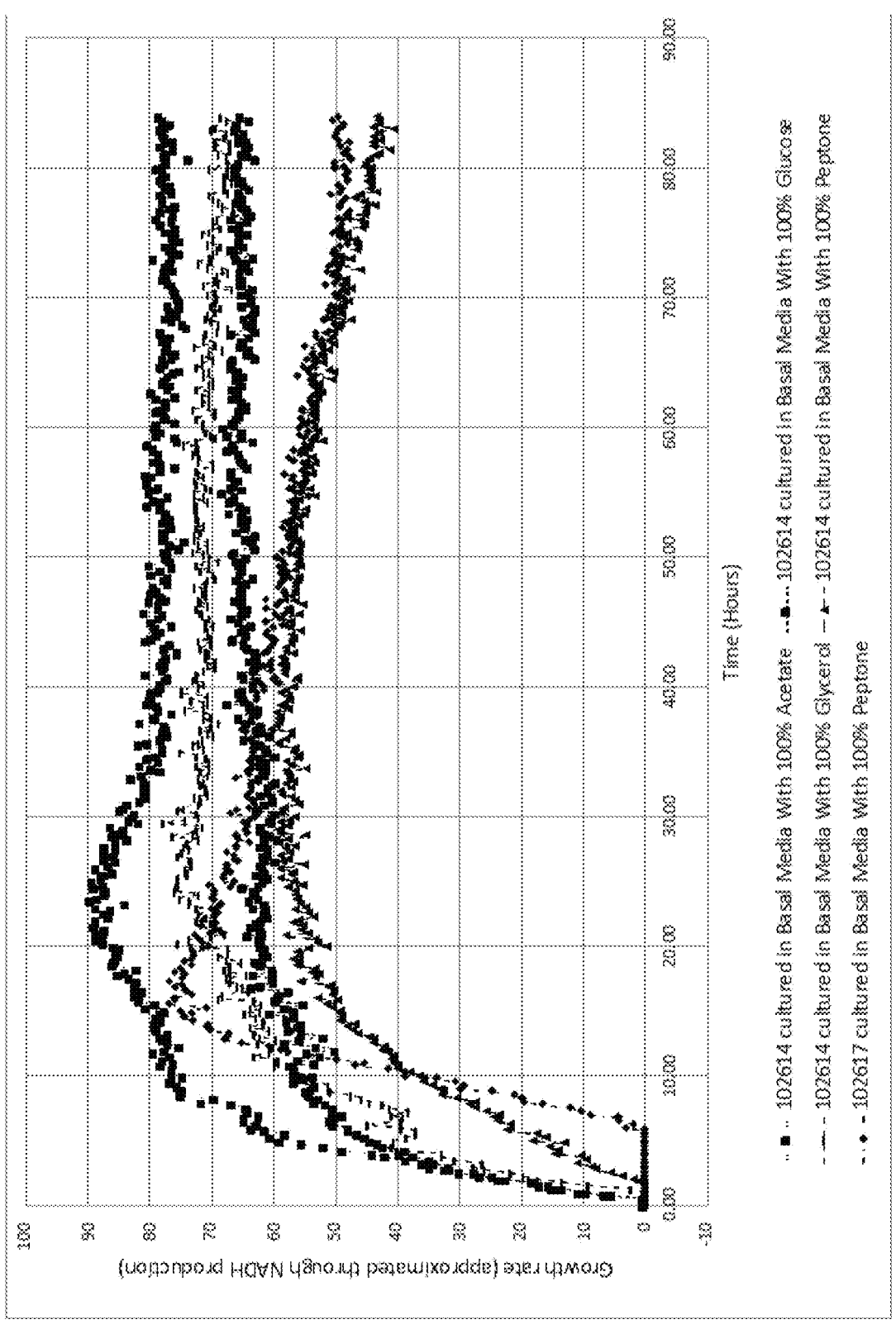
FIG. 1 shows the growth of thraustochytrid strains using various carbon sources.
Figure 2:
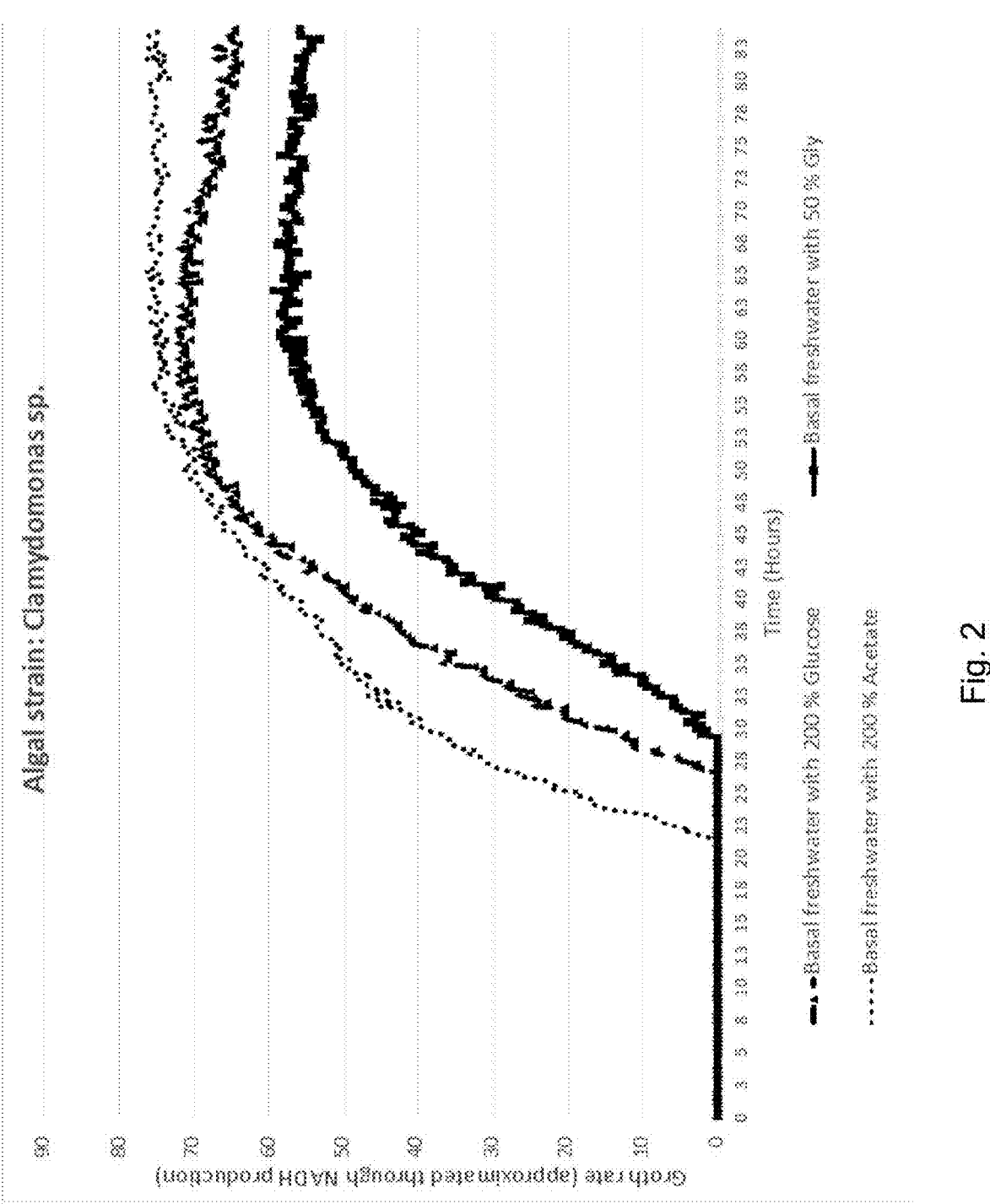
FIGS. 2 to 4 show the growth of non-thraustochytrid strains.
Figure 3:
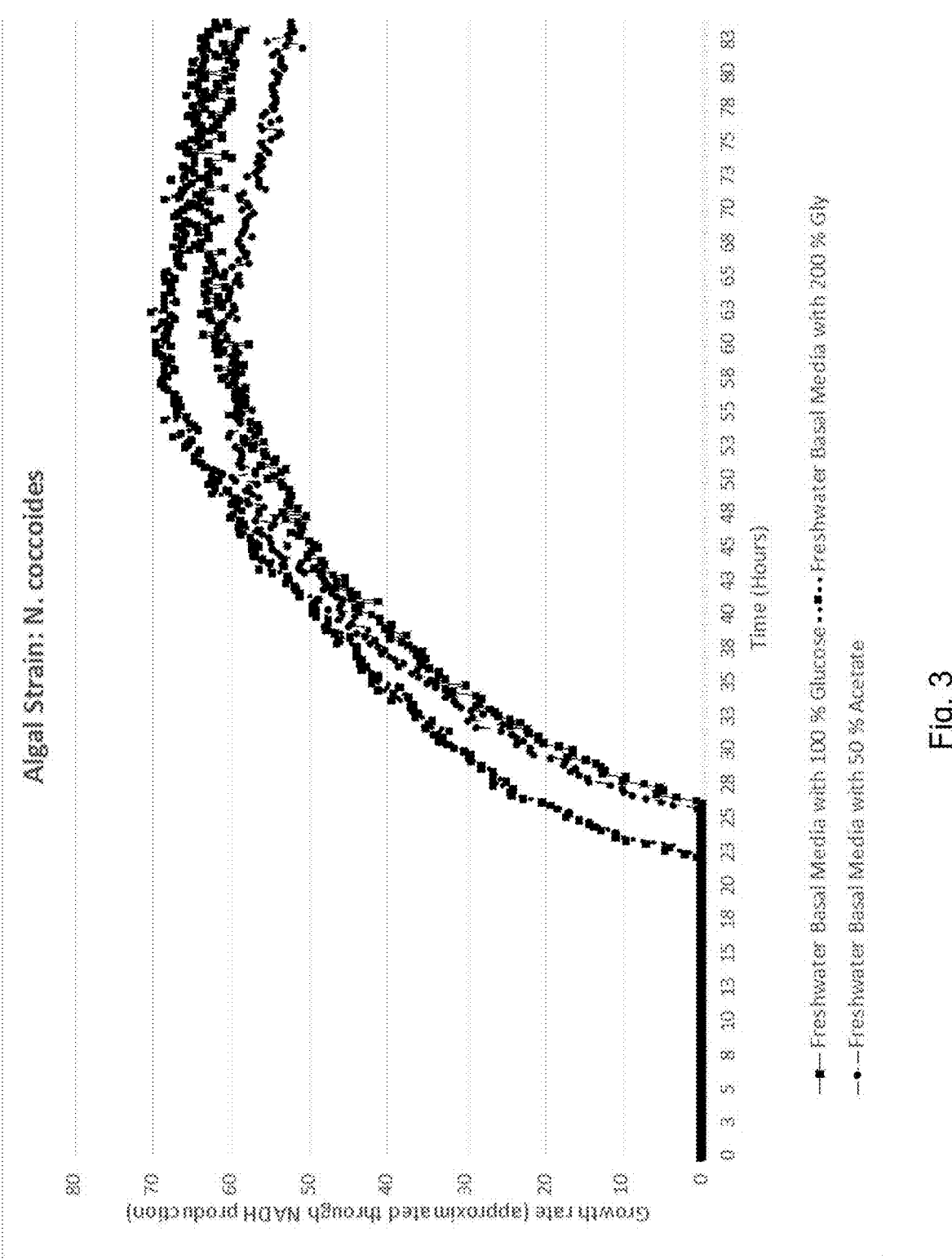
Figure 4:
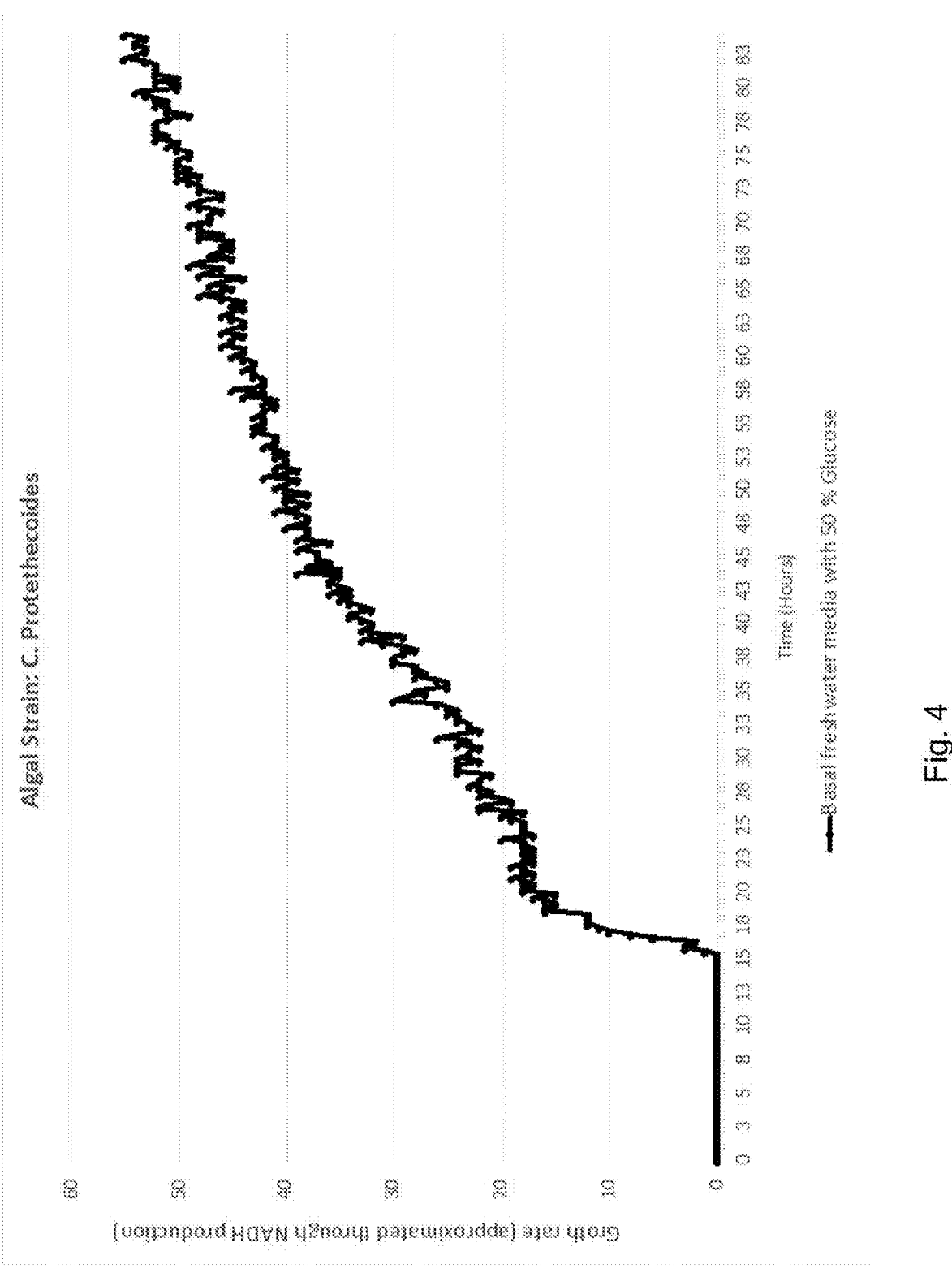

Example 1—Experiments Carried Out to Investigate the Growth of Various Microorganisms Utilising Feedstocks, Indicating the Superior Performance of Thraustochytrids Various microorganisms were cultured in basal media (also referred to as basal freshwater or freshwater basal media) which contained salts, nitrates, yeast extract and a carbon source (glucose, glycerol, peptone or acetate). Growth data obtained from high-throughput experiments are summarized in the graphs of FIGS. 1 to 4. The percentage values associated with glucose, glycerol, peptone or acetate refer to concentration with respect to a standard solution of 40 g/l; therefore, for example, 200% glucose denotes 80 g glucose per litre. The vertical axes in FIGS. 1 to 4 indicate growth rates, assessed by optical measurement and approximated through NADH production. FIG. 1 shows results using Thraustochytrid strains (*Aurantiochytrium*). The strains were obtained from the Japanese Biological Resource Centre NBRC (nite.co.jp/en/nbrc/index.html). They include *Aurantiochytrium* (NBRC no. 102614) and Schizochytrium (NBRC no. 102617). Comparative FIGS. 2 to 4 show results with the following non-thraustochytrid algal strains: *Chlamydomonas* sp., *N. coccoides* and *C. protethecoides*, respectively The thraustochytrid strains distinguished themselves by reaching the maximum growth rate within approximately 24 hours from the time of inoculation (FIG. 1) compared to 60-80 hours required for the other strains (FIGS. 2 to 4). In a large-scale fed-batch fermentation process this could effectively reduce the overall runtime for a batch by two days. The thraustochytrids were also effective at growing on a range of waste organic matter materials and other materials including fructose and potato starch. The Thraustochytrid strains had a superior growth rate and were capable of utilising a wider range of carbon sources and waste streams when compared to other strains.

Further experiments focused on the culturing of microorganisms using by-products of food and drink industries and it was found that Thraustochytrids performed particularly well using products from fermentation and related processes including pot ale.

Example 2—Growth of the Thraustochytrid
*Aurantiochytrium* Sp. Using Pot Ale

Figure 5:
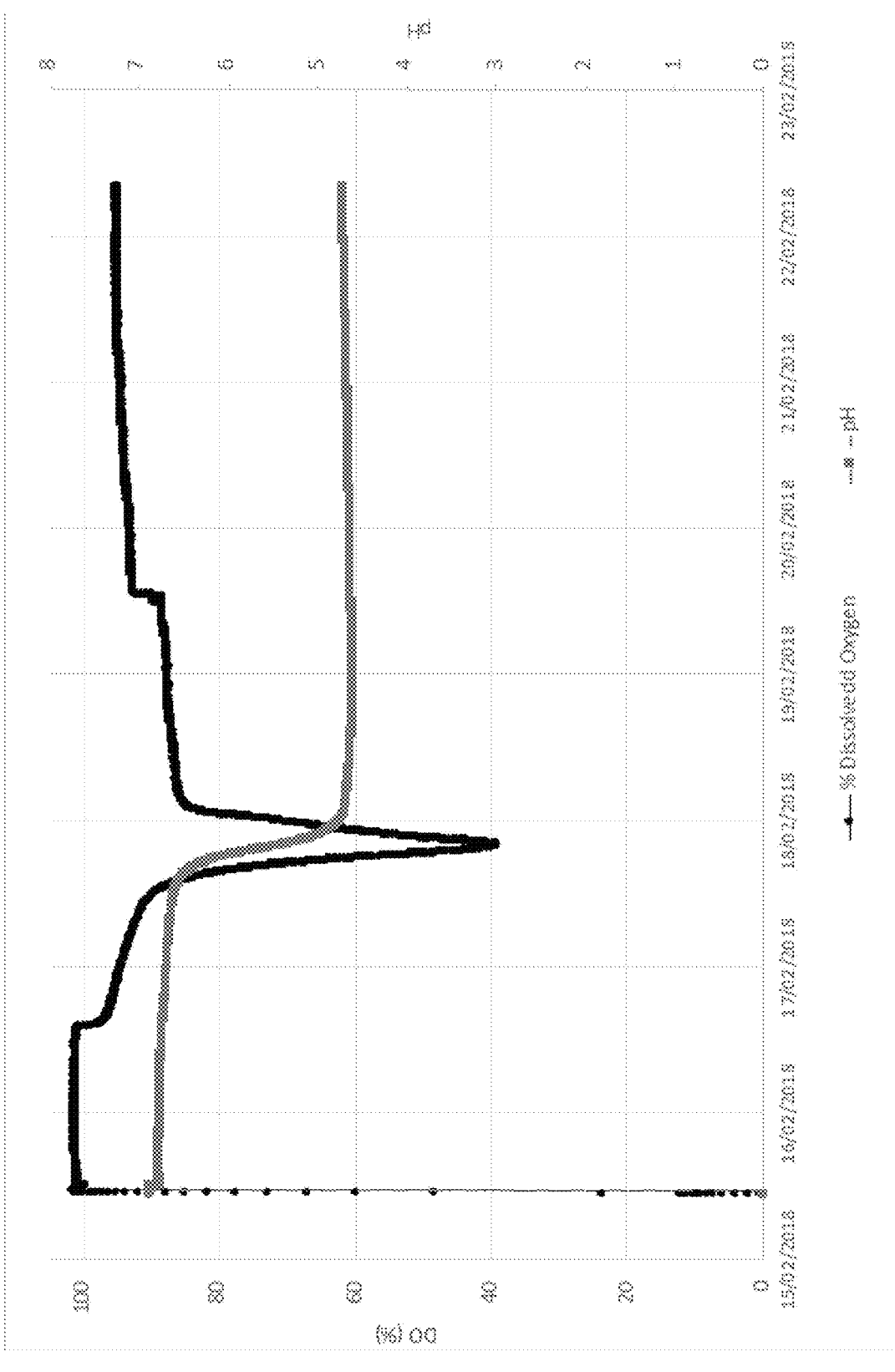
FIGS. 5 to 8 show the change in dissolved oxygen content and pH over time, in growth media comprising, respectively, 12.5%, 25%, 37.5% and 50% (by volume) of pot ale inoculated with a sample of the thraustochytrid *Aurantiochytrium* sp.

Microorganism growth was monitored by observing the change in dissolved oxygen (DO) content in a vessel. FIG. 5 shows the progression of dissolved oxygen content (100% indicates saturation) in a growth medium comprising 12.5% (by volume) of pot ale inoculated with a sample of the thraustochytrid *Aurantiochytrium* sp. As the thraustochytrid feeds on the nutrients supplied by the pot ale it grows, consuming oxygen. This is reflected in the drop in dissolved oxygen. Once all the nutrients have been consumed, the thraustochytrid is no longer able to consume oxygen. The DO value rises as the oxygen dissolved in the medium equilibrates with the atmospheric oxygen.

The changes in pH are believed to be due to the different metabolic reactions that occur during the fermentation. The initial decrease in pH is believed to be due to production of organic acids. As the fermentation progresses, utilisation of complex nitrogen sources within the pot ale may increase the concentration of ammonia which in turn may stabilise or increase the pH.

Figure 6:
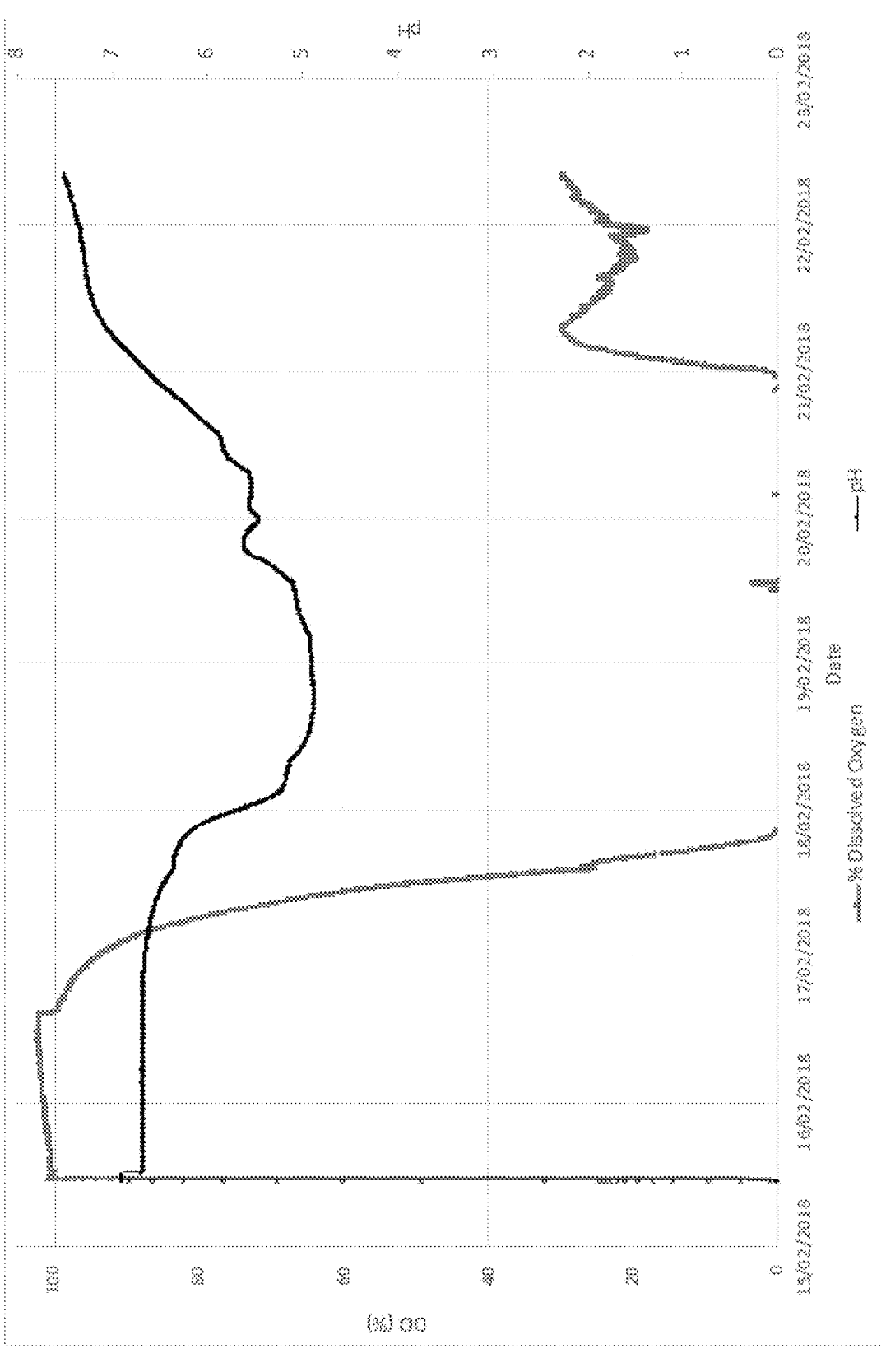
Figure 7:
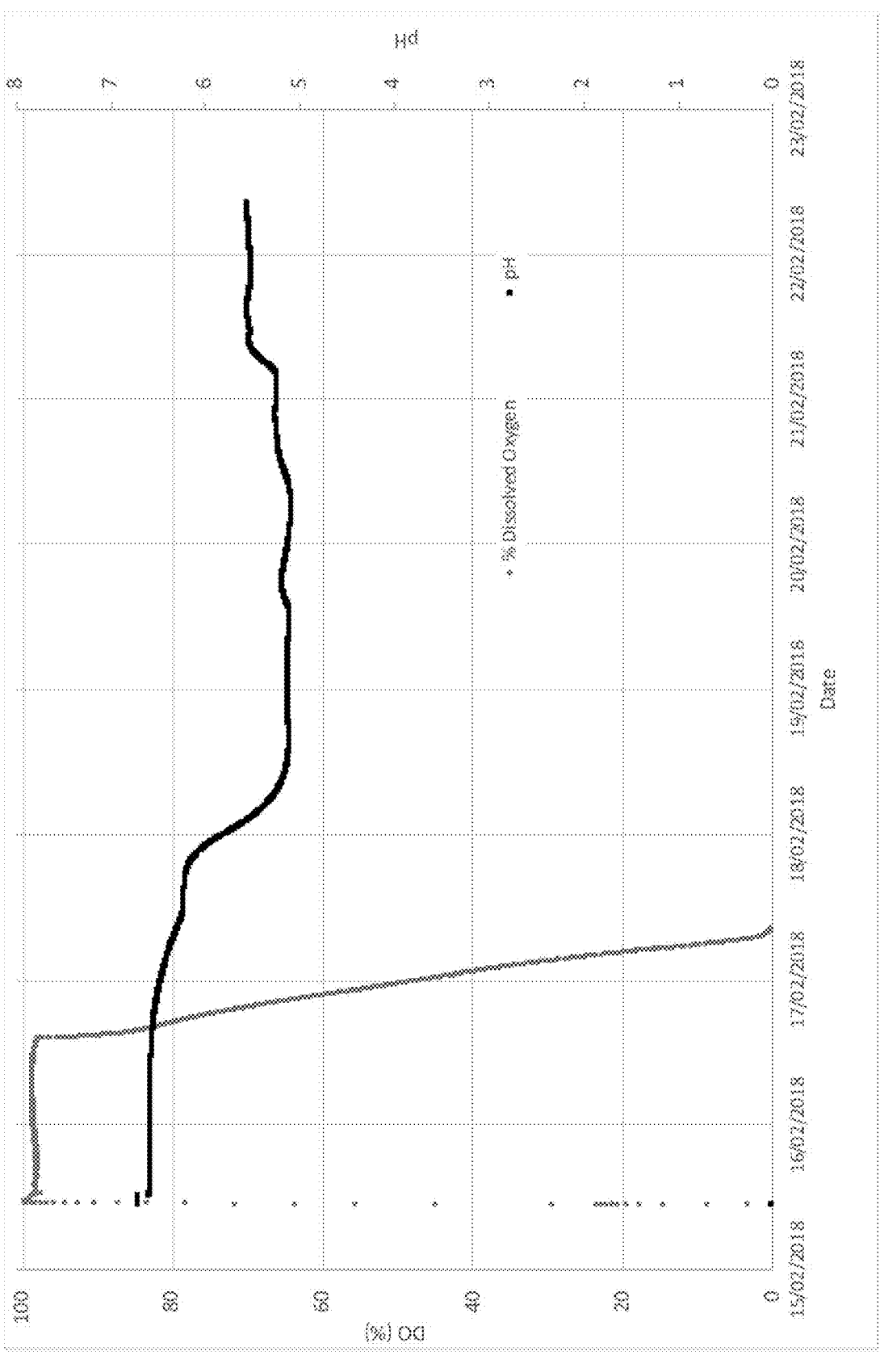
Figure 8:
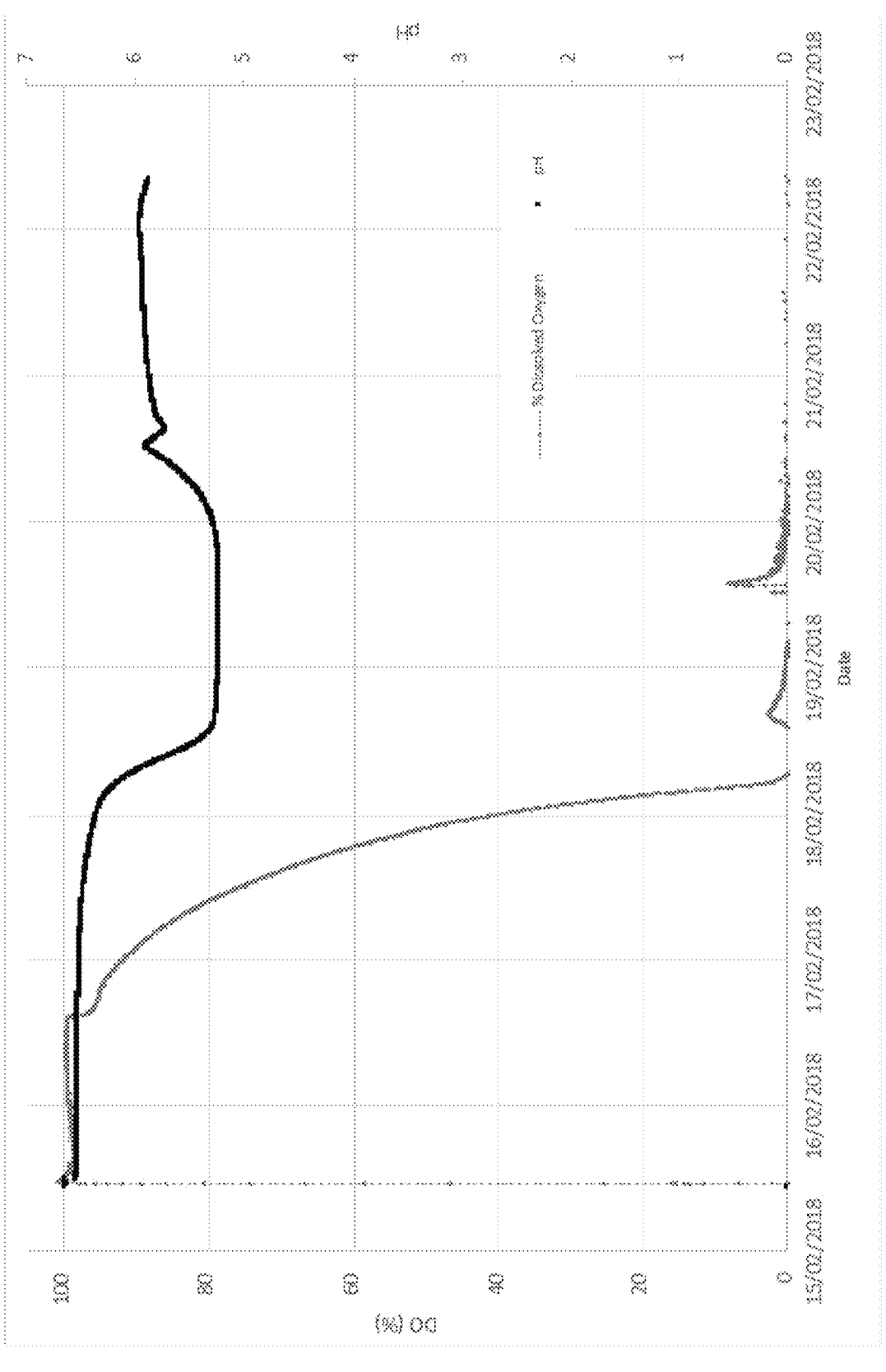

FIGS. 6 to 8 differ from FIG. 5 in that they relate to the use of initial concentrations of pot ale of 25%, 37.5% and 50% by volume respectively.

In all cases, it can be seen that the pot ale acts as an effective organic matter feedstock for the thraustochytrid. Nevertheless, the range of 20 to 55% by volume is particularly effective as this leads to sustained growth.

Addition of further nutrient, e.g. glucose, brings further enhancements. FIG. 9 shows the growth of *Aurantiochytrium* sp. using 25% pot ale growth media with 10 g/L glucose present initially. It can be seen that the thraustochytrid utilises the carbon source within the first 24 hours of inoculation, as indicated by the drop in the dissolved oxygen reading. In comparison, FIG. 10 shows the growth of *Aurantiochytrium* sp. using 25% pot ale growth media with 20 g/L glucose present initially, and with a further 20 g/L glucose added after 3 days: it can be seen that the growth is sustained at maximum levels for up to 144 hours due to the greater quantity of carbon source.

Further experiments investigated the effect of adding further glucose after inoculation. Two experiments were carried out with defined media and pot ale media at 25% concentration using *Aurantiochytrium* sp. For the first experiment the glucose concentration was set at 20 g/L and for the second experiment the strains were initially inoculated into media containing 20 g/L glucose and a further 20 g/L glucose was injected 3 days post inoculation. The mass change per 100 ml in the case of the former was 2.52 g and in the case of the latter was 4.48 g. Accordingly, in the case where a further 20 g/l of glucose was added post-inoculation the productivity was 44.8 g per litre. This is illustrated further in the table below and in FIG. 11.

the fermentation and was an additional method used for the quantification of the cells. The below method was used to measure dry weight:

1. A receptacle was weighed and its mass recorded.
2. A defined amount of sample was placed in the receptacle and weighed and its mass recorded.
3. The sample was dried until there was no change in its mass after repeated drying/weighing.
4. The receptacle was weighed with the dried sample and its mass recorded.

Calculations were carried out as follows:

1. Subtract the weight of the receptacle from the 10 ml of sample with receptacle=Wet mass
2. Subtract the weight of the receptacle from the dried sample with receptacle=Dry mass
3. Dry mass/Wet mass*100=Dry weight (%)

All the dry weight calculations were carried out either in duplicate or triplicate and the value averaged to allow for error.

The cell count and dry weight are not linearly related. The dry weight also includes the mass of the pot ale solids whereas the cell count represents only the cells present in the sample. As the fermentation progresses the pot ale solids are depleted whilst simultaneously the cell numbers increase but still contributing to the overall dry weight differently compared to the pot ale solids. Therefore one value lags behind the other.

Having identified thraustochytrids as exhibiting surprisingly large growth rates compared to the other stains tested, the thraustochytrids were tested further to optimise growth conditions. In particular, the salinity requirements of the thraustochytrids were examined. Thraustochytrids are marine strains and live naturally in a saline environment. High salt concentrations may be disadvantageous however, as this encourages corrosion of metallic parts, for example vessels. In a series of experiments it was determined that thraustochytrids are capable of growing at 25% to 50% of normal sea water concentration without any significant reduction in growth rates. Nevertheless higher salt concentrations may be used if desired. The thraustochytrid growth was monitored by using a dissolved oxygen sensor.

| Preweight crucible (g) | Final weight crucible (g) | Productivity/100 ml | Productivity/1 L |
|---|---|---|---|
| Strain 102614 *Aurantiochytrium* sp. grown on 25% pot ale and 40 g/L glucose: Productivity-44.759 g/L | | | |
| 55.15 | 59.6259 | 4.4759 | 44.759 |
| Strain 102614 *Aurantiochytrium* sp. grown on 25% pot ale and 20 g/L glucose: Productivity-25.244 g/L | | | |
| 54.22 | 56.744 | 2.5244 | 25.244 |

The cell count measurements were carried out using a haemocytometer following a standard protocol:

1. A 10 µL sample of the fermentation media that had been appropriately diluted was added between the cover slip and the counting chamber.
2. Following a standard counting pattern, the cells were counted.
3. Depending on the type of haemocytometer used, a standard formula was used to calculate the cell density (this takes into consideration the average cells, dilution factors and the volume of the chamber, which is dependent on the type of haemocytometer).

Cell density=average cells*dilution factor/square volume

The dry cell weights gave an indication of the productivity of the fermentation. It was measured over the course of

Example 3—Detailed Description of an Example Embodiment

A stainless-steel brewing vessel from a distillery was used as the vessel in which to cultivate thraustochytrid. The brewing vessel was first rinsed with clean water through a spray ball, or similar inlet device, located at the top of the vessel. The vessel was then cleaned with 2% sodium hydroxide for 10 minutes at a temperature of 60°, before rinsing again with clean water. The inside of the vessel was then coated with 0.1% peracetic acid which was allowed to dry on the surface. Throughout this cleaning and sterilization process sterile air was injected into the vessel through a sparger at the bottom of the vessel, maintaining the vessel under a positive pressure. The cleaning and sterilization treatment was performed on every port and line attached to the vessel. This included in-line pasteurisation equipment which was to come into contact with the growth medium.

To prepare a growth medium for the thraustochytrid, pot ale from a Scotch whisky distillery was diluted to contain between 25% and 37.5% pot ale. The chemical oxygen demand was between 13.75 g/L and 20.63 g/L. The pH was adjusted to between 6.8 and 7.5 by adding sodium hydroxide. The following were then added to the pH adjusted, diluted pot ale solution:

20 g/L of glucose;

10.4 g/L of artificial sea salts (for example comprising 66% sodium chloride, 16% magnesium sulphate, 13% magnesium chloride, and smaller quantities of calcium chloride and potassium chloride.

An additional 20 g/L to 40 g/L of glucose was added at day 3 or day 4 depending on the density.

The growth medium prepared in the above manner was fed to the vessel through a flash pasteuriser in the form of a plate heat exchanger. The plate heat exchanger was used to heat the growth medium up to a temperature of between 70° C. and 125° C. The growth medium was maintained at this elevated temperature for between 10 s and 120 s. The medium was then cooled down to 30° C. This was done in two stages. In the first stage, heat from the medium was recovered in a further heat exchanger and transferred to incoming medium entering the pasteurizer, preheating this incoming medium. A further heat exchanger then reduced the temperature of the pasteurized medium further down to the initial growth temperature of 30° C. The pasteurized growth medium was then passed into the cultivation vessel.

An inoculum of thraustochytrid was prepared by growing a microscope confirmed monoculture of the microorganism on a plate culture for 4 or 5 days. The precise timing is dependent on growth conditions and the person skilled in the art will have no difficulty in judging this appropriately. This initial inoculum was next transferred to a suitable sterile borosilicate glass container with 3-way hosing cap. The glass container comprised a section of peristaltic hosing section attached for sterile transfer of the inoculum to the cultivation vessel. A glass syringe was attached to a check valve which was attached to the glass container, allowing for sterile sampling of the inoculum prior to it entering the cultivation vessel.

A mixture of thraustochytrid inoculum and pasteurized growth medium (a highly nutritious medium consisting of pot ale at 37.5%, glucose at 20 g/L and 10.4 g/L of artificial sea salts and high levels of dissolved oxygen) present in the cultivation vessel was maintained at a growth temperature of around 30° C. for a period of 3 to 4 days, during which the thraustochytrid proliferated rapidly. This resulted in a maximum cell number being achieved and the nutrients being depleted. In the next phase the cells entered the accumulation phase of growth: at this stage a further 20 g/L of glucose was fed to the vessel and the vessel temperature was reduced to 10-15° C. This change in the conditions is thought to induce a stress reaction in the thraustochytrid and thereby encourage the production of Omega-3 oils. The thraustochytrid was then cultured for a further 2 days.

Quality controls were carried out at appropriate stages to determine the purity of the starter culture, the efficacy of the in-line pasteurisation, the functioning of the air filter and the quality of the vessel sterilization.

At the end of the growth process, the resultant thraustochytrid was dewatered using conventional dewatering techniques. Dewatering was carried out to approximately 10% of the original volume. This produced an Omega-3 enriched algal paste. This paste can be further processed to produce an oil or a powder.

Example 4—Enzymatic Pre-Treatment of Distillery by-Product

It was found that enzymatic pre-treatment of distillery by-product could increase the glucose concentration by 480% in some experiments. On average, during the course of several fermentations carried out with enzymatic pre-treatment, it was found to increase the glucose utilisation of the thraustochytrid by up to 20% and the productivity by at least 25%.

To enable maximum conversion efficiency of the enzymes, prior to enzyme addition the pH of the pot ale media was adjusted to between pH 6-7 and enzyme addition was at a concentration range of between 0.01-0.05% v/v.

Algae (thraustochytrids) were aseptically inoculated from existing stock liquid cultures at 2% v/v within a laminar flow cabinet. Algal flask cultures were incubated at 30° C. with shaking (95 rpm) for a minimum of 2 days prior to enzymatic treatment experiments.

Enzymatic pre-treatment was performed in 50 ml conical flaks containing 25 mL fresh pot ale pH adjusted to pH 6-7 depending on the enzyme being used. All experiments were carried out in triplicate flasks along with triplicate control flasks. Preceding enzyme addition, pot ale flasks were autoclave sterilised using standard sterilisation temperature and duration.

Enzyme stock solutions were aseptically added at 0.02% v/v to sterilised pot ale flasks and filter sterilised water added to control flasks. Following enzyme addition, flasks were re-sealed and incubated at 30° C. with shaking (95 rpm) for 20 hours.

TABLE

| Adjusted pH used in each flask, chosen based on best fit reported for each enzyme optimum pH and working range. | |
| --- | --- |
| Enzyme | Pot ale adjusted pH used |
| Amyloglucosidase | 6 |
| Prolyl endopeptidase | 6 |
| Cellulase | 6 |
| Papain | 7 |
| Subtilisin | 7 |
| Lyticase | 7 |
| Control (pH 6) | 6 |
| Control (pH 7) | 7 |

Enzymatic pre-treatment validation on soluble glucose levels were measured prior to and following enzyme treatment step. Preceding the incubation step, triplicate samples were taken aseptically from each sterilised flask and final post-treatment triplicate samples at the end of the incubation period. To carry out the glucose measurements the samples were centrifuged at 13,000 rpm for 10 minutes and the glucose was measured using SD Code free glucose monitor and corresponding glucose strips.

For the algal growth quantification, following a 5-day incubation period algal culture flasks were triplicate sampled at the start and end of the fermentation for glucose measurements. For algal productivity calculations, a 1 ml sample was aseptically taken from each flask and use for cell count measurements detailed earlier.

The invention claimed is:

1. A method for cultivating a thraustochytrid in a vessel containing a composition, the method comprising:

combining the composition and the thraustochytrid; and applying a process to the combined composition and thraustochytrid for cultivation of the thraustochytrid, wherein the composition comprises a by-product from a distillation step used in malt whisky manufacture.

2. The method as claimed in claim 1, further comprising sterilizing said vessel prior to charging it with said thraustochytrid and said composition.

3. The method as claimed in claim 2 wherein said sterilizing comprises cleaning with an alkali followed by rinsing with water followed by applying an antimicrobial agent to coat the interior surfaces of said vessel.

4. The method as claimed in claim 1, wherein further comprising pasteurizing said composition or said by-product prior to charging said vessel with the same.

5. The method as claimed in claim 1, wherein said cultivation results in a product comprising lipids, wherein the lipids comprise oils or fatty acid.

6. The method as claimed in claim 5, wherein said product comprises omega-3 fatty acids.

7. The method as claimed in claim 1, wherein said cultivation comprises: a first stage of proliferating thraustochytrid from an inoculum of thraustochytrid; and a second stage of causing a stress response of the thraustochytrid due to a differing nutrient supply from that of the first stage, which enhances the accumulation of one or more omega-3 oil or other useful product.

8. The method as claimed in claim 1, wherein said cultivation comprises: a first stage of proliferating thraustochytrid from an inoculum of thraustochytrid in media that promotes sporulation; a second stage of utilizing alcoholic by-products as a carbon source for cell growth and wherein a nutrient supply differs from that of the first stage; and a third stage, wherein fermentation parameters in the third stage differ from the first stage and second stage causing a stress response of the thraustochytrid to enhance the accumulation of one or more omega-3 oil or other useful product.

9. A method of processing a by-product from an alcoholic beverage manufacturing process, the method comprising:

providing a by-product from a distillation step used in malt whisky manufacture;

applying a thraustochytrid to said by-product; and allowing said by-product to be used as a growth medium for said thraustochytrid to result in a product.

10. The method of claim 9, wherein the by-product comprises pot ale.

11. The method of claim 9, wherein the product comprises lipids, wherein the lipids comprise oils or fatty acids.

12. The method of claim 1, wherein the composition comprises pot ale.

* * * * *